United States Patent
Rubinstein et al.

(10) Patent No.: US 6,880,020 B1
(45) Date of Patent: Apr. 12, 2005

(54) METHOD AND SYSTEM FOR INSTALLING DIFFERENT COMMUNICATIONS JACKS INTO AN INTELLIGENT DATA CONCENTRATOR

(75) Inventors: Alan Rubinstein, Fremont, CA (US); Gary Wang, Cupertino, CA (US)

(73) Assignee: 3Com Corporation, Santa Clara, CA (US)

( * ) Notice: Subject to any disclaimer, the term of this patent is extended or adjusted under 35 U.S.C. 154(b) by 270 days.

(21) Appl. No.: 10/082,496

(22) Filed: Feb. 22, 2002

Related U.S. Application Data

(60) Provisional application No. 60/277,593, filed on Mar. 20, 2001, provisional application No. 60/277,767, filed on Mar. 20, 2001, provisional application No. 60/277,451, filed on Mar. 20, 2001, provisional application No. 60/277,592, filed on Mar. 20, 2001, provisional application No. 60/285,419, filed on Apr. 20, 2001, and provisional application No. 60/301,532, filed on Jun. 26, 2001.

(51) Int. Cl.$^7$ .............................................. G06F 13/00
(52) U.S. Cl. ....................................................... 709/250
(58) Field of Search .............................. 439/1, 43, 214, 439/215, 345, 373; 370/465, 503; 709/200, 250; 710/1, 62, 63

(56) References Cited

U.S. PATENT DOCUMENTS 6,611,537 B1 * 8/2003 Edens et al. ................. 370/503

* cited by examiner

*Primary Examiner*—Robert B. Harrell

(57) ABSTRACT

Embodiments of the present invention facilitate coupling electronic devices to an intelligent data concentrator. The intelligent data concentrator is operable for multiplexing data signals from a plurality of client devices to a network interface using client interfaces. Embodiments of the present invention include a faceplate which can hold interface adapters. The interface adapters hold the client interfaces in a substantially fixed position relative to the faceplate.

20 Claims, 7 Drawing Sheets

METHOD AND SYSTEM FOR INSTALLING DIFFERENT COMMUNICATIONS JACKS INTO AN INTELLIGENT DATA CONCENTRATOR

RELATED APPLICATIONS

This application claims priority to the now abandoned provisional patent applications: patent application Ser. No. 60/277,593, entitled "Intellijack Physical Concepts," with filing date Mar. 20, 2001, and assigned to the assignee of the present invention; patent application Ser. No. 60/277,767, entitled "A Method for Managing Intelligent Hardware for Access to Voice and Data Networks," with filing date Mar. 20, 2001, and assigned to the assignee of the present invention; patent application Ser. No. 60/277,451, entitled "A Method for Filtering Access to Voice and Data Networks by use of Intelligent Hardware," with filing date Mar. 20, 2001, and assigned to the assignee of the present invention; patent application Ser. No. 60/277,592, "Intellijack Usage," with filing date Mar. 20, 2001, and assigned to the assignee of the present invention; patent application Ser. No. 60/285,419, "Intelligent Concentrator," with filing date Apr. 20, 2001, and assigned to the assignee of the present invention; and patent application Ser. No. 60/301,532, "Intelligent Concentrator," with filing date Jun. 26, 2001, and assigned to the assignee of the present invention.

FIELD OF THE INVENTION

The present invention relates to the field of networking. More specifically, the present invention relates to a device and system for efficiently multiplexing data, voice, and FAX lines between the work site and the network.

BACKGROUND OF THE INVENTION

Modern Local Area Networking (LAN) is generally accomplished by extensive runs of multiple parallel cables to multiple connections and devices at each work site. This is in addition to voice telephone, FAX, and device power cabling. When LAN infrastructures require change, it is generally more efficient to leave existing cables in place and simply string new cables between switch and router nodes and any new work site devices.

FIG. 1 illustrates a conventional prior art LAN implemented with a server 104 and three work stations (e.g., work stations 1110, 120, and 130). A work station might be populated with a computer 107, a network printer 108, a laptop 101 or other devices and combinations of devices that require direct communication with server 104 in order to function properly. Additionally, a voice telephone 109, using Voice Over Internet Protocol (VoIP) technology might be in the modern work station. Each of these devices requires a cable connection 115 to the server or to its peripheral switching mechanisms. As discussed earlier, each of these connections currently requires a separate cable run which can be very expensive and can compromise system integrity and security.

The current state of the art for implementing data multiplexing and Firewall technology, on a per user basis, is centered around providing the capability in a centralized head end data switch or router or by distributing these functions to the end user's location by placing a box level data concentrator switch and security equipment, whether hardware firewall, access control or hardware encryption device, next to the computing equipment that is to be connected to a data LAN.

Current distributed solutions are ad hoc, of questionable reliability, inefficiently managed, and subject to failures caused by accidental removal of power and wire breakage. Current solutions require local power which adds an installation requirement and reduces system reliability. Security can be breached through intentional or inadvertent bypassing of any installed Firewall. Software solutions are hard to deploy and maintain in the field and once installed are subject to attacks through common hacking techniques. An additional weakness of software solutions is that the device that is to be networked may not be able to host the required software.

Additionally, communications jacks for devices manufactured by different vendors may have different physical characteristics which prevent using any kind of universal receiving port to connect devices to a LAN. For example, a user may desire to connect both a computer and a USB-supported printer (e.g., printer 108 of FIG. 1) to the network. The need to accommodate this variety of communications jacks complicates building and changing LAN infrastructures.

SUMMARY OF THE INVENTION

What is needed, then, is a method of reliably multiplexing data, voice, and FAX lines in order to reduce the cost of installation and infrastructure change in a LAN. A need also exists for a device or method that satisfies the above need, and facilitates coupling an intelligent data concentrator with electronic devices having a variety of communications jacks.

Embodiments of the present invention facilitate coupling electronic devices to an intelligent data concentrator. The intelligent data concentrator is operable for multiplexing data signals from a plurality of client interfaces to a network interface. Embodiments of the present invention comprise client interfaces which have different physical characteristics to facilitate communicatively coupling various electrical devices with the intelligent data concentrator. A faceplate for the intelligent data concentrator holds the various client interfaces in standard sized openings with interface adapters. The present invention implements intelligent hardware that is easy to install and reliably provides an attachment point for access to voice and data networks inside of a wall or in internal space provided for in an office cubicle.

These and other advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENTS

Reference will now be made in detail to the preferred embodiments of the present invention, examples of which are illustrated in the accompanying drawings. While the present invention will be described in conjunction with the preferred embodiments, it will be understood that they are not intended to limit the present invention to these embodiments. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
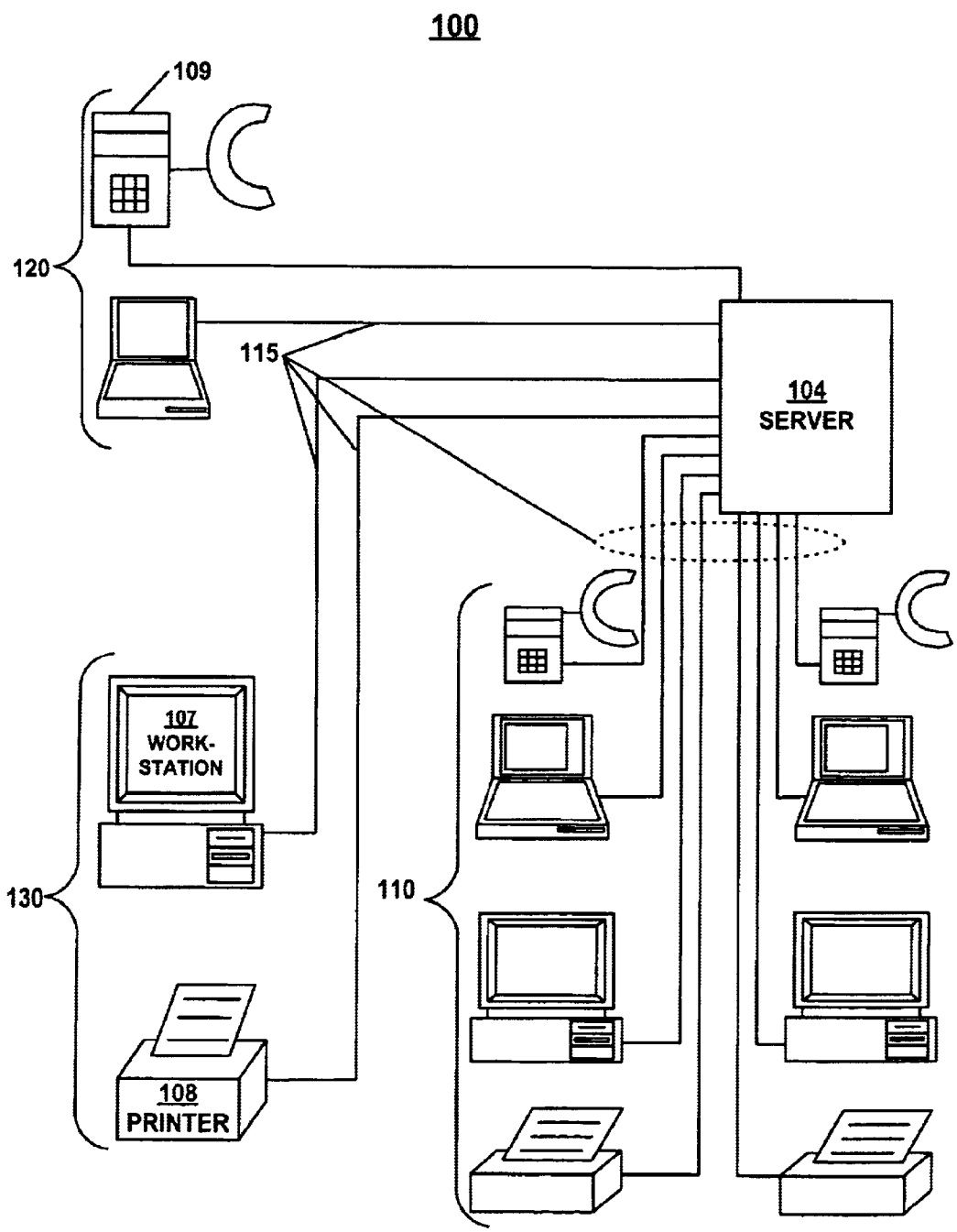
FIG. 1 is a diagram of an exemplary prior art data network.
Figure 2:
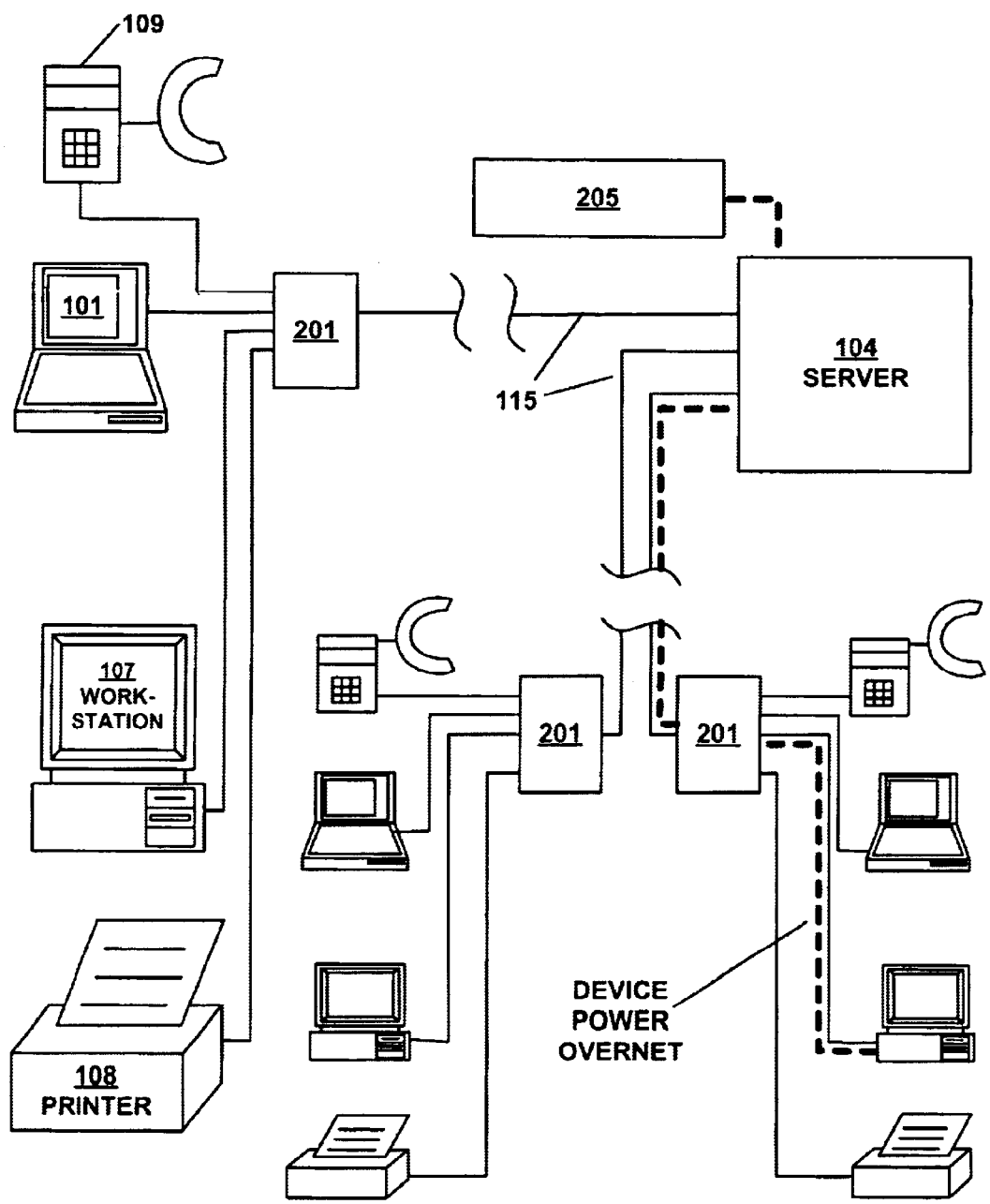
FIG. 2 is a diagram of a data network using intelligent data concentrators in accordance with embodiments of the present invention.

FIG. 2 illustrates a Local Area Network 200 configured with the same equipment as in FIG. 1. In FIG. 2, the work station equipment has been connected to the network via intelligent data concentrators 201 in accordance with embodiments of the present invention. All of the same functions and devices of the previous work stations including VoIP telephony are represented but, using intelligent concentrators 201, a single cable is all that is required to connect the work station equipment suite with the server rather than the multitude of cables previously required. The intelligent data concentrator is operable to provide connections to a network for transferring data and for multiplexing signals from devices coupled with it (e.g., computer 107 and printer 108) to server 104. It should be noted that the various devices in work stations 110, 120, and 130 are likely to use different communications jacks. For example, computer 107 may require an RJ45 communications jack while printer 108 and VoIP telephone 109 require Universal Serial Bus (USB) jacks. The present invention facilitates connecting different communications jacks to intelligent data concentrator 201 and thus increases its functionality.

Power for the intelligent data concentrator as well as devices connected to it can be provided from a central power source 205 over the network cabling. This would also facilitate forwarding power to data devices that are connected to the communications jacks that are coupled with concentrator 201. The power that is provided could be connected in a manner that would isolate the effect of electrical faults due to component failures or shorts in the connected device or the wires to it. Such isolation could prevent a failure that is external to the intelligent data concentrator from damaging it and would isolate the failure in a way that would allow the concentrator itself and devices that are connected to the unit to remain operational. Recovery of the effected port would be automatic and could occur as soon as the failed device or wire is removed. One embodiment of the present invention would implement this feature with current limiting fold back circuitry. An alternative implementation could be through self-healing "Poly Switch" fuses but current limiting is the preferred implementation since it would allow the embedded intelligence to sense the condition and report it to a central management console.

In addition to providing a means of sharing a single physical network connection among several devices at a work station, the intelligent concentrator employed by this embodiment of the present invention, and the devices connected to it, could be powered over the same cabling that would be used for data communications. Multiplexing power to devices in this embodiment over the data lines eases deployment considerations by eliminating the need to locate a device next to an existing power source which may not be readily available. Another benefit of employing the same wiring and a central power feed is an increase in system reliability by eliminating service calls for times that the end user accidentally unplugs the system power. The ability to power devices over fiber-optic cabling is not precluded here. Indeed, some types of devices are currently capable of receiving power directly from a fiber-optic connection.

As shown in FIG. 2, the present invention provides a system for installing different communications jacks into intelligent data concentrator 201. For example, in one embodiment, printer 108 can be a USB supported printer which has a communication jack with a different physical configuration than computer 107. Because of the different physical configurations of the devices coupled to it, intelligent concentrator requires a variety of client interfaces that are capable of physically and communicatively coupling with the various electrical devices.

In the preferred embodiment of the present invention, a faceplate for data concentrator 201 is provided which can hold various interface adapters. These interface adapters fixedly support the client interfaces within uniformly sized openings in the cover of the data concentrator so that the client interfaces can not move around and be damaged. In so doing, the present invention facilitates installing different communications jacks into an intelligent data concentrator without having to substantially modify the concentrator itself.

The present invention utilizes an intelligent data concentrator that is easily installed and reliably provides an attachment point for access to voice and data networks. The Intelligent data concentrator is implemented through miniaturized hardware that can be installed inside a wall or in an internal space provided for in an office cubicle. One surface of the Intelligent data concentrator is intended to be accessible by the end user and would in most instances be on an external surface of a workspace.

Figure 3:
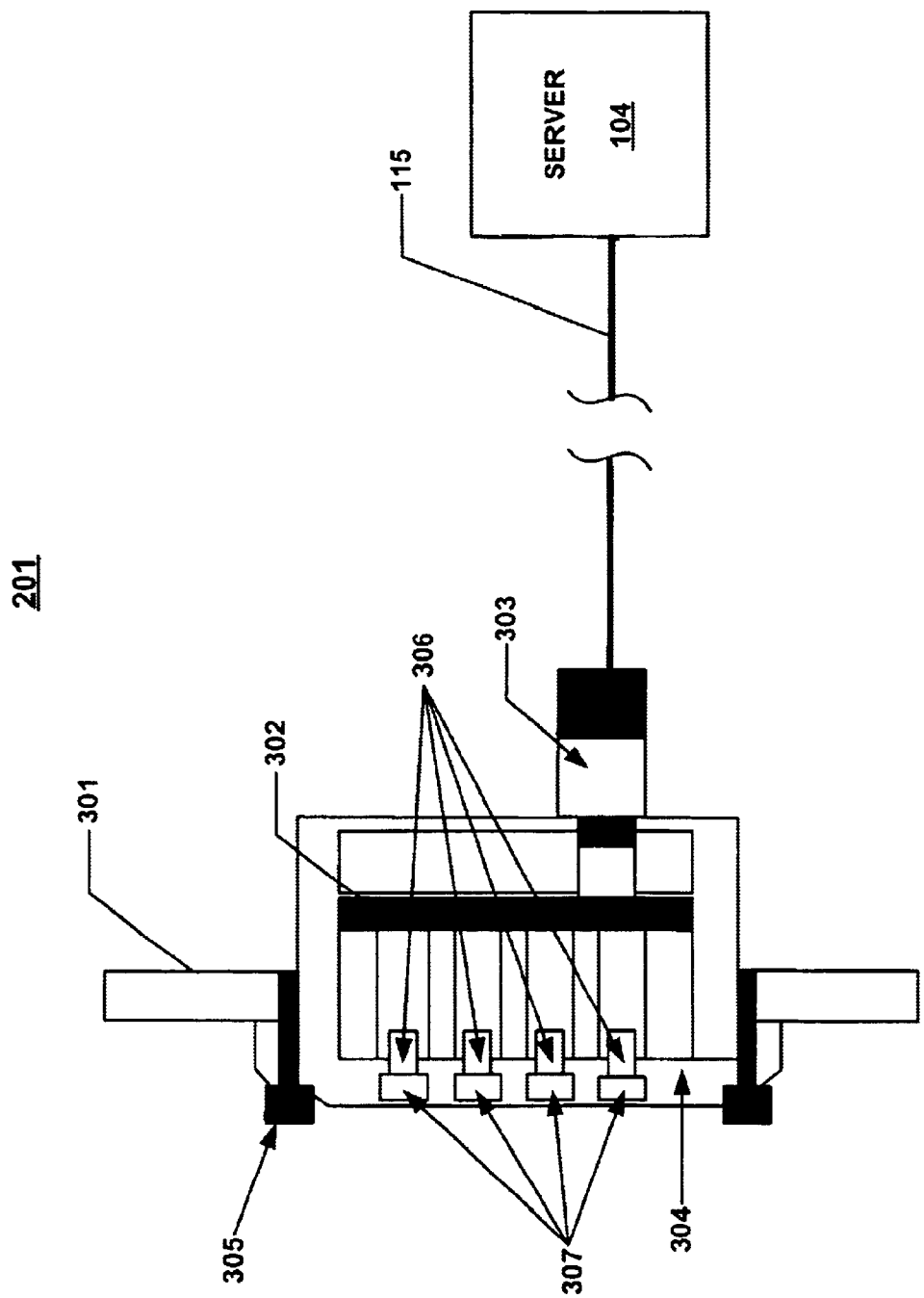
FIG. 3 is a cross section view of an exemplary intelligent data concentrator in accordance with embodiments of the present invention.

FIG. 3 is a cross section view of an intelligent data concentrator 201 utilized in embodiments of the present invention. A housing 301 is coupled with electronics 302 for multiplexing signals from a plurality of client interfaces to a network interface 303. In one embodiment, electronics 302 comprises a processor and a memory unit. The processor is intended to include, but not limited to: a standard processor, a robust processor, and a central processing unit (CPU). The memory unit is intended to include, but not limited to random access (volatile) memory (RAM) and read-only (non-volatile) memory (ROM). In one embodiment, software is provided for managing (e.g., multiplexing data signals) data received at concentrator 201. However, concentrator 201 can also be implemented as an intelligent remote testing device. This allows the network infrastructure and cabling to be tested and evaluated from a central location without any action being required at the work site. Additionally, concentrator 201 can also be implemented as a security device, preventing physical attachment to the LAN cabling without a notification being sent to the server that the physical network port has been compromised. Network interface 303 couples concentrator 201 with other network devices (e.g., server 104) via cable connection 115.

A faceplate 304 is attached to housing 301 by fasteners 305. In one embodiment, fasteners 305 are screws which can only be removed with special tools to prevent a user from detaching faceplate 304 and tampering with electronics 302. Alternatively, snap fit techniques can, for example, be used to accomplish the same result. Faceplate 304 allows access to a plurality of client interfaces 306 which are for connecting various electronic devices to collector 201. For example, a variety of client interfaces having different physical characteristics (e.g., RJ-45, RJ-11, USB, etc.) can reside within a given data concentrator to communicatively couple a variety of devices with network interface 303.

Faceplate 304 also holds an interface adapter 307 for fixedly holding one of client interfaces 306 with respect to faceplate 304. The interface adapters are sized to fit in standard sized openings in faceplate 304 while holding the client adapters. Interface adapter 307 allows a client interfaces having different physical characteristics to reside within concentrator 201. For example, one of the interface adapters can hold a USB communications jack while another holds an RJ-45 client interface and third adapter holds a Firewire communications jack. While the present embodiment recites these specific communications interfaces, the present invention is well suited for connecting a wide variety of communications interfaces with network interface 303.

Figure 4:
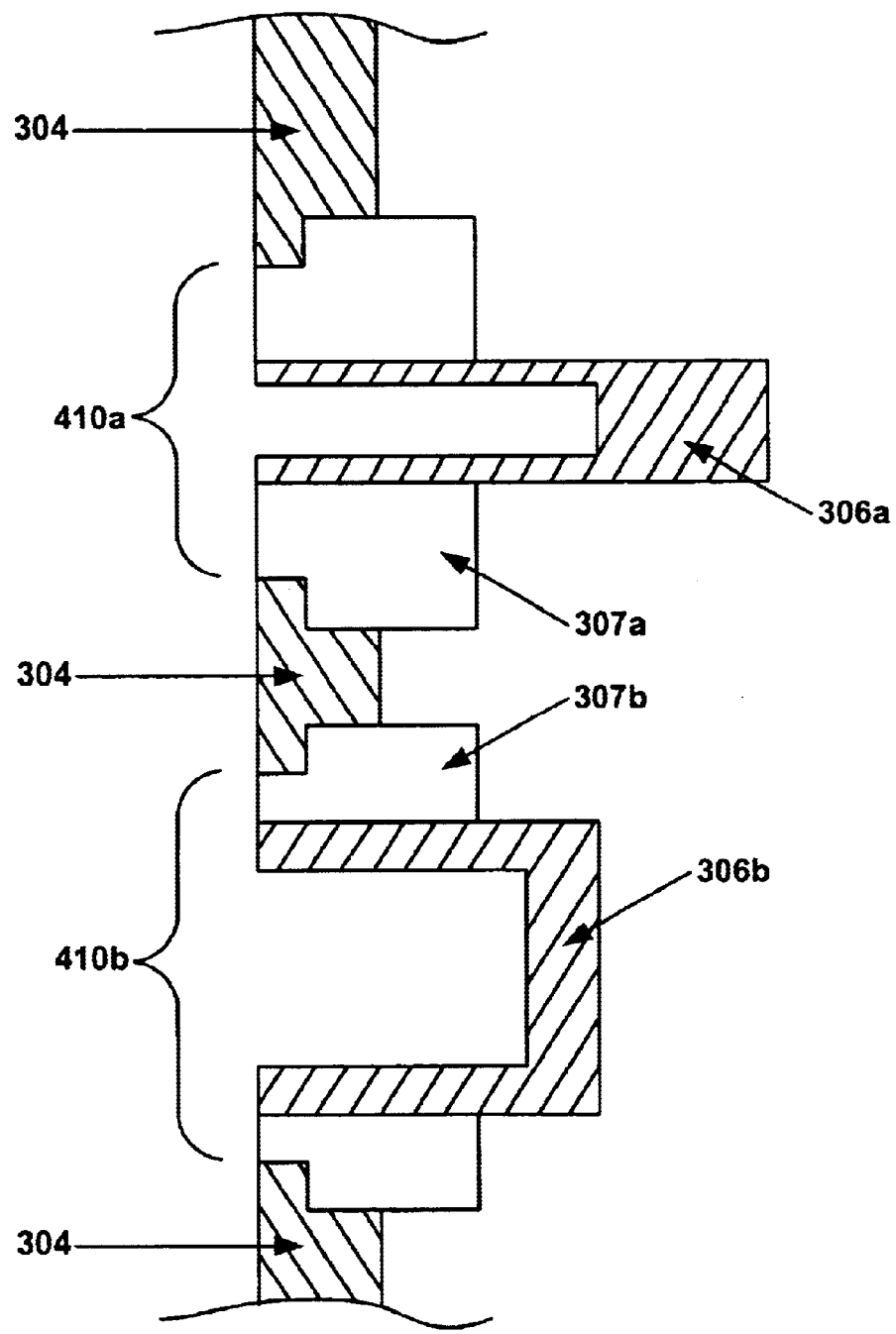
FIG. 4 is a cross section view showing in greater detail portions of an intelligent data collector in accordance with embodiments of the present invention.

FIG. 4 shows, in greater detail, a cross section view of faceplate 304 to more clearly show the interface adapters used in accordance with embodiments of the present invention. As shown in FIG. 4, a plurality of openings 410 are in faceplate 304. These are standard sized openings which are large enough to accommodate a variety of communications jacks which are commonly used for connecting electronic devices to a communications network. Two interface adapters 307 are shown which fit into openings 410. Interface adapters 307 hold various sized client interfaces in the standard sized openings 410 of faceplate 304. One interface adapter (e.g., adapter 307a) is for fixedly holding a USB client interface (e.g., client interface 306a) relative to opening 410a. Another interface adapter (adapter 307b) fixedly holds an RJ45 client interface (e.g., client interface 306b) relative to opening 410b. It should be appreciated that any communications jack can fixedly held by interface adapters 307, including but not limited to: RJ-11; RJ-45; USB; SCSI; and FireWire (IEEE 1394) communications jacks.

Connections to a central data network (LAN) or voice telephone network (or perhaps dedicated FAX lines) are terminated at intelligent data concentrator 201. These connections would be established by an installer and would not be intended to be accessible by the end user. In most instances, the wiring between the concentrator and the communications infrastructure would terminate inside the wall or possibly office cubicle fixture. Termination of the network wiring (voice or data) would provide for both a reliable electrical and mechanical connection for industry standard communications cabling such as CAT-3, CAT-5 or CAT-5E or similar cabling. A variation of the implementation could also similarly accommodate fiber-optic cabling or wireless LAN technologies.

In addition to terminating data connections, this embodiment of the present invention could support digital telephone connections, such as those entailed by VoIP (Voice Over Internet Protocol) technology. In the intended implementation, an RJ-45 connector or other modular connector could be configured to provide either a LAN data connection or a digital telephone connection. The end user would be able to insert a data cable or a telephone into the jack and either device would be supported. The end user would not have to actively configure or program this embodiment to enable either mode of operation.

In one embodiment, at least two distinct network connections (e.g., cable connections 115) are operable within a single intelligent concentrator. In such an embodiment, each network connection terminates in one or more client interfaces. The client interfaces coupled to one network are switch ports, requiring only one network cable per group of communication jacks. Thus, a plurality of distinct network connections can be serviced and provided at a single intelligent concentrator.

Figure 5A:
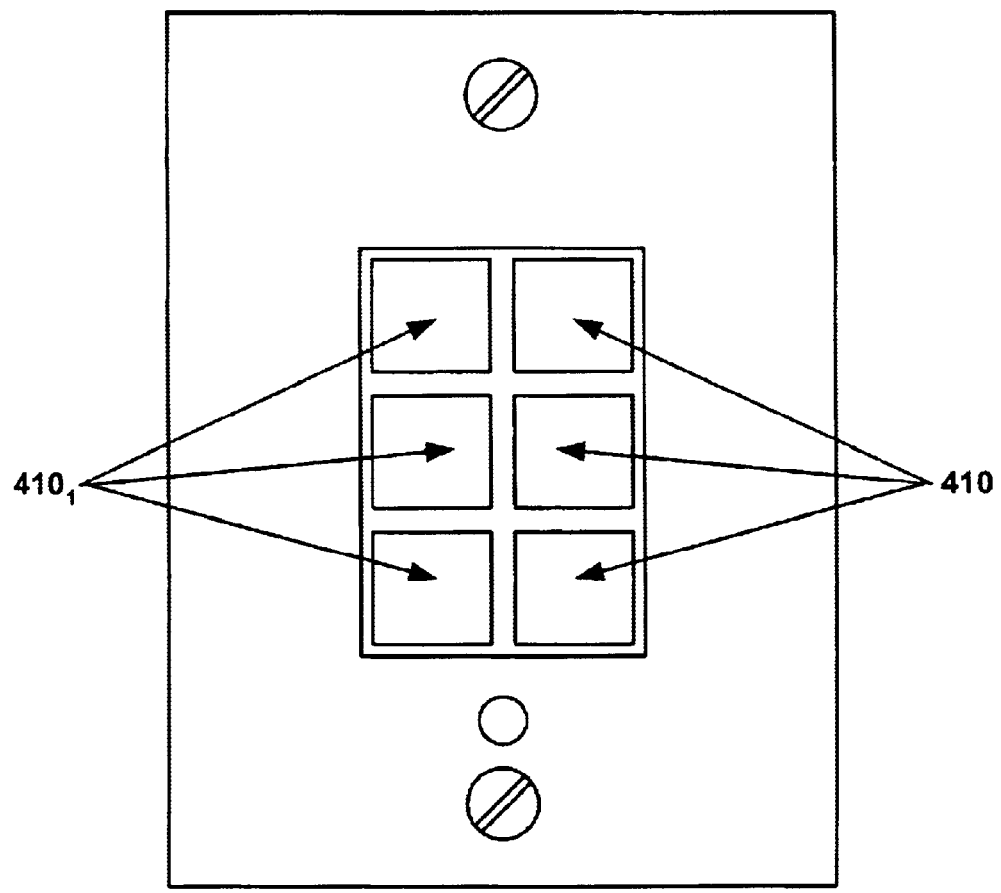
FIGS. 5A and 5B show exemplary faceplates in accordance with embodiments of the present invention.
Figure 5B:
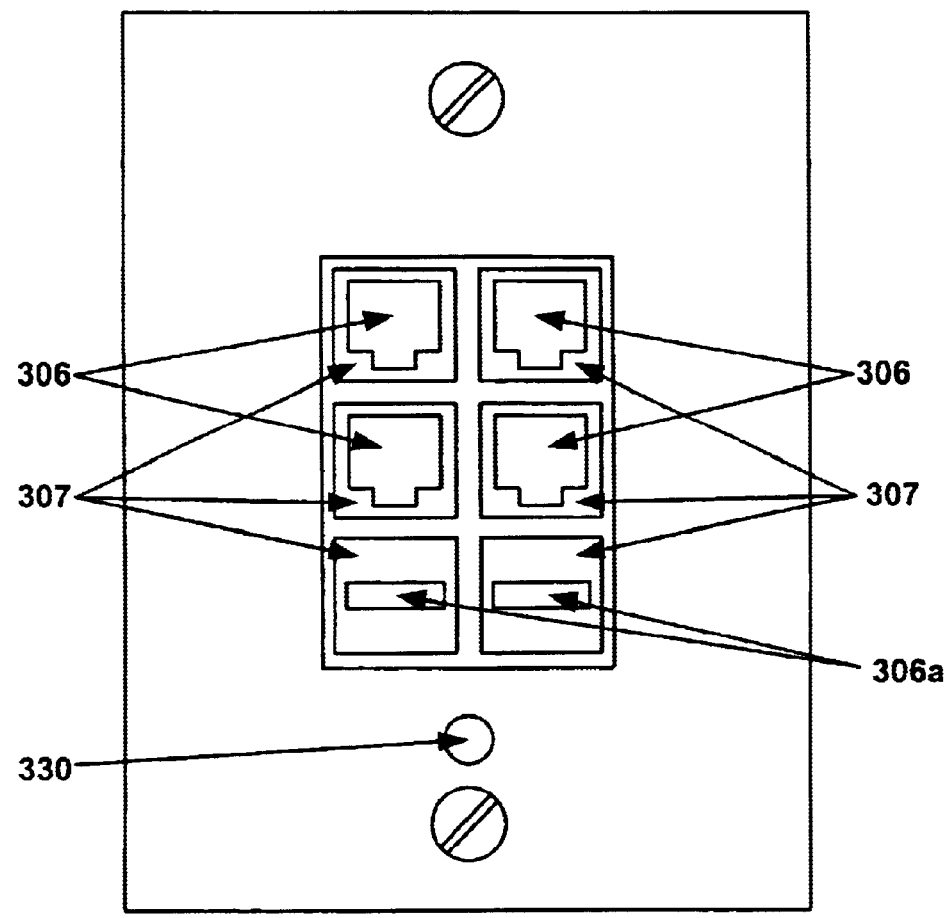

FIGS. 5A and 5B illustrate an exemplary faceplate 304 utilized in embodiments of the present invention. FIG. 5A shows an exemplary faceplate 304 which has not yet been configured with client interfaces 306 or interface adapters 307. As shown in FIG. 5A faceplate 304 has a plurality of standard sized openings 410 into which interface adapters 307 can be placed. Interface adapters 307 are sized so that when placed into one of the openings, it will be held securely by the portion of faceplate 304 surrounding opening 410. When interface adapters 307 are fitted to client interfaces 306, faceplate 304 can then be coupled with housing 301. This allows the use of a faceplate with standard sized openings into which interface adapters 307 are fitted. In FIG. 5B, faceplate 304 is shown configured with four RJ-45 client interfaces 306. Two additional client interfaces 306a are provided for USB supported devices. A status indicator light 330 is also shown which indicates the status of the network connection of concentrator 201. According to embodiments of the present invention, two or more network connections may terminate at concentrator 201. With reference to FIG. 5, connections to one network can, for example, be implemented through the interfaces on the left side of faceplate 304, while the second network can be accessed through the interfaces on the right side of faceplate 304.

In addition to wired connections to and from this embodiment and the client devices, wireless connectivity could also be viable. Standard communication media such as IR, BlueTooth, 802.11 or other means could be utilized to communicate with concentrator 201. For wireless connectivity, an antenna or an IR port could be built into faceplate 304 of the implemented unit itself. The antenna could also be constructed to allow it to be implemented on or above the surface of faceplate. The electronics suite contained within housing 301 in this embodiment could provide the additional supporting circuitry to implement a wireless LAN connection as well.

Another significant advantage offered by this embodiment is the provision of a degree of directionality that could be optimized to limit the number of devices, both intended and unintended, with which any unit would be able to communicate. By employing directionality and shielding, the occupant of a workspace would be able to reliably communicate with the unit while another person In an adjacent space using similar equipment would be less likely to interfere with or even gain access to the first user's communication.

The benefits that accrue from the physical mounting of the device in the manner already described would add significantly to the functionality, reliability and the range of functions that could be performed by this embodiment. Installations that do not provide for the termination of the wiring to the network internal to a protected surface such as a wall or a cubicle are inherently unreliable and are subject to a degrading of connections from mechanical stress, abrasion and related mechanisms. The placement of attachment points in a protected environment would eliminate problems from accidental stresses that could occur. Mechanical stress could occur if a user were to snare a device cable and inadvertently pulled on the embodiment, either directly or through the attached cable. The mounting hardware would isolate the forces to which the wiring is subjected.

Figure 6:
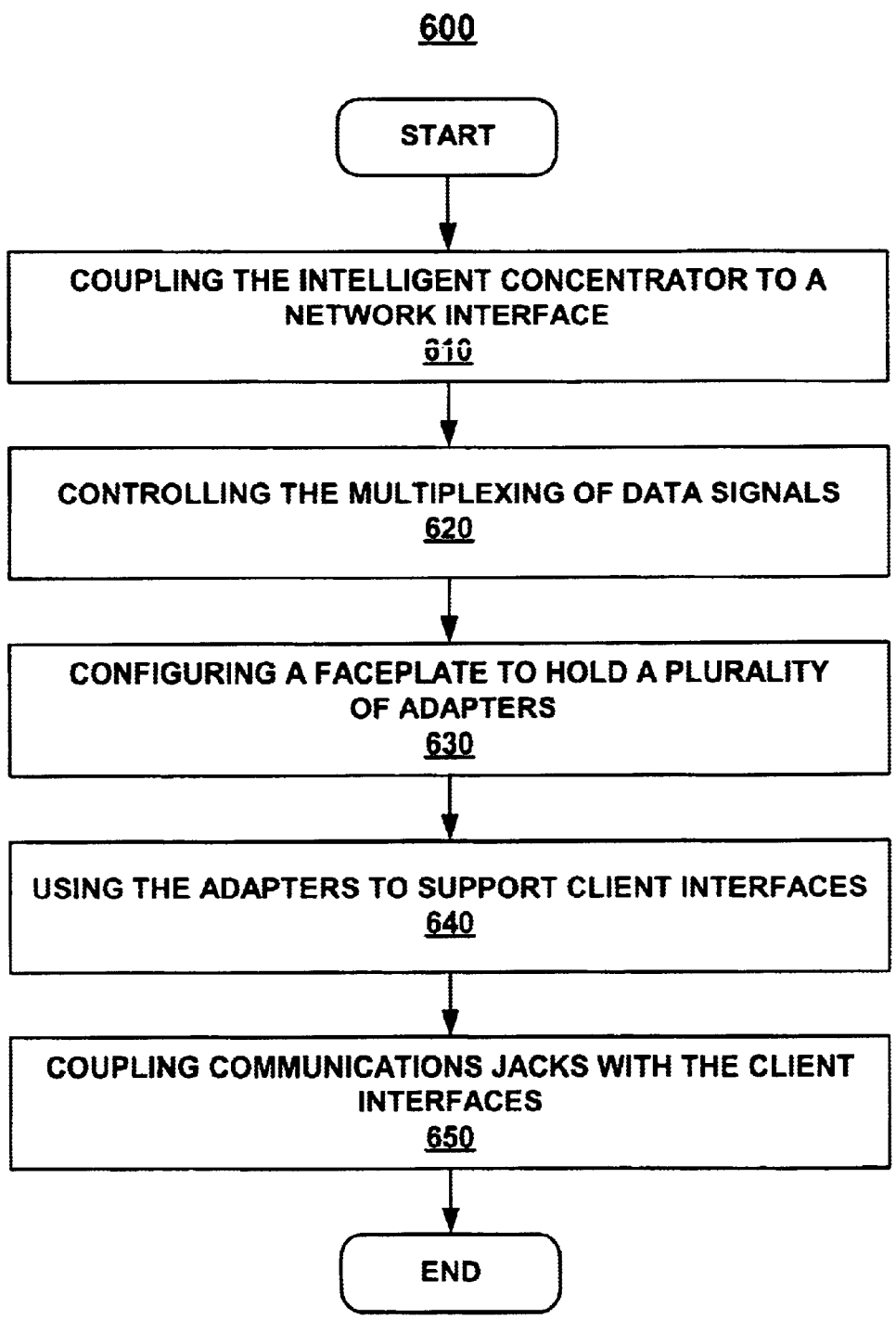
FIG. 6 is a flow chart of a method for installing different communications jacks into an intelligent data concentrator in accordance with embodiments of the present invention.

FIG. 6 is a flow chart of a method for installing different communications jacks into an intelligent data concentrator in accordance with embodiments of the present invention. With reference to FIG. 2, and to step 610 of FIG. 6, the intelligent concentrator is coupled with a network interface. Intelligent data concentrator 201 is coupled with a network interface to communicatively couple various electronic devices with network 200. The intelligent data concentrator 201 is mounted in a workspace in such a manner that it is accessible to a user.

With reference to FIG. 3, and to step 620 of FIG. 6, electronic circuitry residing within the intelligent data concentrator is used for controlling the multiplexing of data signals between a plurality of client interfaces and the network interface. Electronic circuitry 302 comprises a processor and memory which are operable for multiplexing data signals between client interfaces 306 and network interface 303.

With reference to FIG. 3, and to step 630 of FIG. 6, a faceplate is configured to hold a plurality of interface adapters. Faceplate 304 is configured to be coupled with housing 301 of intelligent data concentrator 201. Faceplate 304 has standard sized openings which hold a plurality of interface adapters 307.

With reference to FIG. 4, and to step 640 of FIG. 6, the interface adapters are used to support the client interfaces. Interface adapters 307a and 307b fixedly hold client interfaces 306a and 306b, which have different physical characteristics, relative to faceplate 304.

With reference to FIG. 2, and to step 660 of FIG. 6, communications jacks from a variety of electronic devices are coupled with the client interfaces. Communications jacks from various electronic devices (e.g., computer 107 and printer 108) are coupled with client interfaces (e.g., client interfaces 306 of FIG. 3). In so doing, the electronic devices are communicatively coupled with network 200 using intelligent data concentrators 201.

The preferred embodiment of the present invention, a method and system for installing different communications jacks into an intelligent data concentrator, is thus described. While the present invention has been described in particular embodiments, it should be appreciated that the present invention should not be construed as limited by such embodiments, but rather construed according to the following claims.

What is claimed is:

1. An intelligent concentrator comprising:
    a housing configured to be accessible to a user;
    electronic circuitry residing within said housing for multiplexing data transfer between a first network interface and a plurality of client devices;
    a plurality of interchangeable client interfaces for communicatively coupling said plurality of client devices with said electronic circuitry;
    a faceplate configured to be coupled with said housing and configured to hold a plurality of interface adapters; and
    said plurality of interface adapters for holding said plurality of interchangeable client interfaces in a substantially fixed position relative to said faceplate.

2. The intelligent concentrator as recited in claim 1, wherein a first of said plurality of interchangeable client interfaces has different physical characteristics than a second of said plurality of client interfaces.

3. The intelligent concentrator as recited in claim 1, wherein said electronic circuitry comprises:
    a processor; and
    a memory unit.

4. The intelligent concentrator as recited in claim 1, said system further comprising:
    a second network interface; and
    at least one client interface of said plurality of interchangeable client interfaces communicatively coupled with said second network interface by said electronic circuitry.

5. The intelligent concentrator as recited in claim 1, wherein said intelligent concentrator is operable to provide power to said plurality of client devices through said first network interface.

6. The intelligent concentrator as recited in claim 1, wherein said electronic circuitry is further operable for assisting in the maintenance of network security.

7. The intelligent concentrator as recited in claim 1, wherein said electronic circuitry is further operable for communicating system information to said network.

8. A configurable interface for an intelligent concentrator comprising:
    a housing configured to be mounted in a workspace and be accessible to a user;
    electronic circuitry residing within said housing and operable to control the multiplexing of signals from a plurality of interchangeable client interfaces having different physical characteristics to a network interface; and
    a cover configured to be coupled with said housing, said cover holding a plurality of interface adapters for fixedly supporting said plurality of interchangeable client interfaces within said cover.

9. The configurable interface as recited in claim 8, wherein said electronic circuitry comprises:
    a processor; and
    a memory unit.

10. The configurable interface as recited in claim 8, said network interface further comprising:
    a second network interface; and
    at least one client interface of said plurality of interchangeable client interfaces communicatively coupled with said second network interface by said electronic circuitry.

11. The configurable interface as recited in claim 8, wherein said intelligent concentrator is operable to provide power to an electronic device through said first network interface.

12. The configurable interface as recited in claim 8, wherein said electronic circuitry is further operable for assisting in the maintenance of network security.

13. The configurable interface as recited in claim 8, wherein said electronic circuitry is further operable for communicating system information to said network.

14. A method for installing communications jacks into an intelligent concentrator comprising:

coupling said intelligent concentrator to a network interface, said intelligent concentrator configured to be mounted in a workspace in such a manner that said intelligent concentrator is accessible to a user;

controlling the multiplexing of data signals between a plurality of interchangeable client interfaces and said network interface using electronic circuitry residing within said intelligent concentrator;

configuring a faceplate to be coupled with said intelligent concentrator and to hold a plurality of interface adapters;

using said plurality of interface adapters to fixedly support said plurality of interchangeable client interfaces within said faceplate; and coupling said communications jacks with said plurality of interchangeable client interfaces.

15. The method for installing communications jacks into an intelligent concentrator as recited in claim 14, wherein said plurality of interchangeable client interfaces comprises client interfaces having different physical characteristics.

16. The method for installing communications jacks into an intelligent concentrator as recited in claim 14, wherein said electronic circuitry comprises:

a processor; and a memory unit.

17. The method for installing communications jacks into an intelligent concentrator as recited in claim 14, said method further comprising:

coupling a second network interface with said intelligent concentrator; and using said electronic circuitry to communicatively couple a client interface of said plurality of interchangeable client interfaces with said second network interface.

18. The method for installing communications jacks into an intelligent concentrator as recited in claim 14, wherein said method further comprises using said intelligent concentrator to provide power to an electronic device through said network interface.

19. The method for installing communications jacks into an intelligent concentrator as recited in claim 14, wherein said electronic circuitry is further operable for assisting in the maintenance of network security.

20. The method for installing communications jacks into an intelligent concentrator as recited in claim 14, wherein said electronic circuitry is further operable for communicating system information to said network.

* * * * *